W. S. ATWOOD.
TREAD PLATE.
APPLICATION FILED JAN. 14, 1915.

1,215,235.

Patented Feb. 6, 1917.

Witnesses

Inventor
W. S. Atwood
By
Attorneys

UNITED STATES PATENT OFFICE.

WILLIAM S. ATWOOD, OF MONTREAL, QUEBEC, CANADA.

TREAD-PLATE.

1,215,235.  Specification of Letters Patent.  Patented Feb. 6, 1917.

Application filed January 14, 1915. Serial No. 2,177.

*To all whom it may concern:*

Be it known that I, WILLIAM S. ATWOOD, a citizen of the Dominion of Canada, and resident of the city of Montreal, in the Province of Quebec and Dominion of Canada, have invented certain new and useful Improvements in Tread-Plates, of which the following is a full, clear, and exact description.

This invention relates to improvements in tread plates, and the object is to provide a plate which may be manufactured at a minimum cost, and which will have gripping surface and drainage facilities equal to or greater than the plates described in my former patent applications, Ser. Nos. 871,055, 872,584 and 872,585.

A further object is to provide a tread plate having the gripping surface thereof formed to have as nearly as possible the maximum gripping effect per unit of length.

In the manufacture of apertured tread plates having the apertured edges upturned to form gripping members, it is somewhat easier to turn up the whole edge of the aperture than only a part, as described in my former applications. The disadvantage of turning up a gripping member entirely around each aperture is that drainage through the apertures is prevented. According to this invention, therefore, the plate is formed with a plurality of apertures entirely surrounded by upstanding burs, and a plurality of unburred or downwardly burred apertures arranged at regular intervals between the upwardly burred apertures. By this means, better footing is obtained on the plate, and as good, if not better, drainage than that provided by the plates described in my former applications.

In the drawings which illustrate the invention:—

Figure 1:
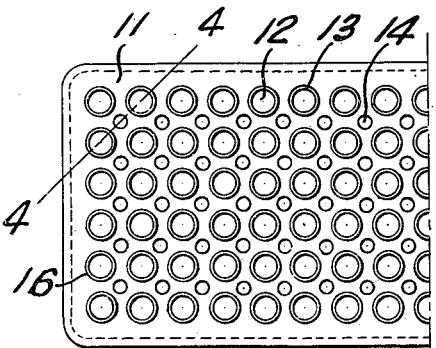
Figures 1 and 2 are plan views showing two possible arrangements of plate apertures.
Figure 2:
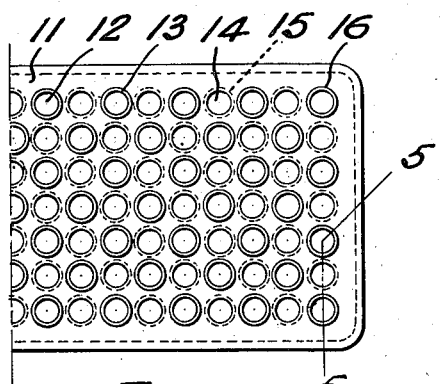
Figure 3:
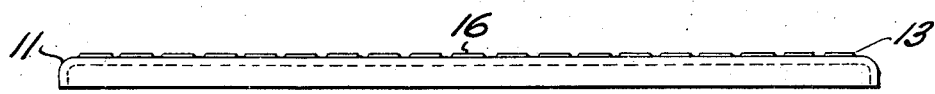
Fig. 3 is a front elevation of a plate.
Figure 4:
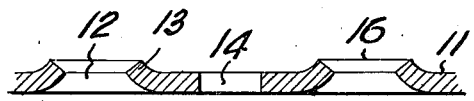
Fig. 4 is a longitudinal section of a plate formed according to Fig. 1.
Figure 5:
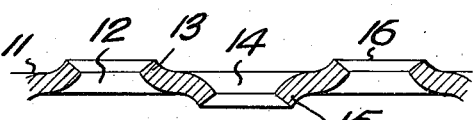
Fig. 5 is a section on the line 5—5, Fig. 2.
Figure 6:
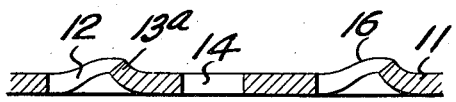
Figs. 6 and 7 show plates formed similarly to those in Figs. 4 and 5, except that the burs do not entirely surround the apertures.
Figure 7:
Figure 8:
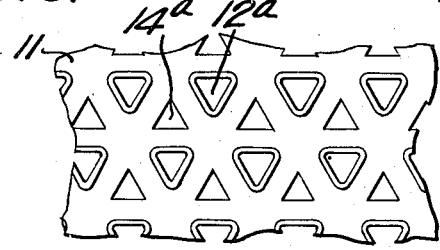
Fig. 8 is a fragmentary plan view showing the invention applied to non-circular apertures.

Referring more particularly to the drawings, 11 designates a plate having a plurality of apertures 12 formed therein and provided with upstanding burs 13 completely surrounding the same. The apertures 12 are arranged in any suitable rectangular pattern, such as those indicated in Figs. 1 and 2. Apertures 14 of suitable size are alternated with the apertures 12. These apertures are preferably not provided with burs of any description. It is obvious, however, that by making the apertures 14 the same size as the apertures 12 and surrounding them with downwardly projecting burs 15, corresponding with the upwardly projecting burs 13, a reversible plate is produced. In Figs. 6 and 7, the plates are shown corresponding with those in Figs. 4 and 5, except that the burs 13$^a$ and 15$^a$ do not entirely surround the apertures 12 and 14, as clearly seen. In Fig. 8, triangular, *i. e.*, non-circular apertures 12$^a$ and 14$^a$ are provided arranged on the same plan as shown in Figs. 1 and 2.

Throughout the drawings, it will be noted that the metal displaced to form the burs at the edges of the apertures has been bent through approximately only an acute angle. This particular bending presents a comparatively sharp rough edge 16 as a gripping surface, whereas if the metal is bent through 90°, the thickness of the plate is presented as the gripping surface, and while more or less rough, has comparatively large area and therefore has not the same gripping efficiency.

Having thus described my invention, what I claim is:—

1. A device of the character described, comprising a plate having apertures therein, upstanding burs surrounding said apertures and drainage means between said apertures.

2. A device of the character described, comprising a plate having apertures therein, burs surrounding said apertures and drainage openings between said apertures in a lower horizontal plane than said apertures.

3. A device of the character described, comprising a plate having apertures, upstanding burs surrounding said apertures, and drainage means between said apertures comprising unburred openings.

4. A device of the character described, comprising a plate having apertures therein, and upstanding burs surrounding alternate apertures on opposite sides of said plate.

In witness whereof, I have hereunto set my hand, in the presence of two witnesses.

WILLIAM S. ATWOOD.

Witnesses:
S. R. W. ALLEN,
G. M. MORELAND.